W. J. REESER.
SEED PLANTING DEVICE.
APPLICATION FILED JAN. 30, 1914.
1,124,523.
Patented Jan. 12, 1915.
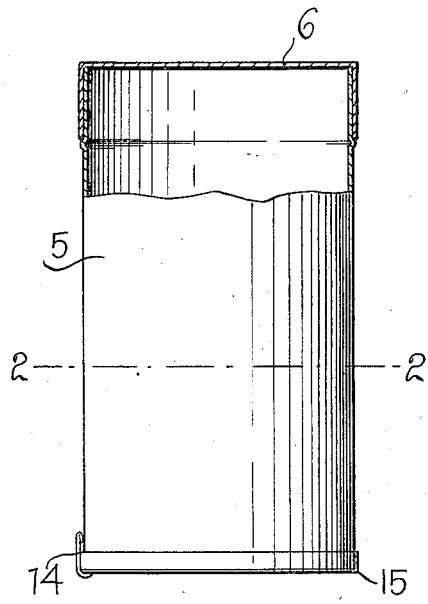
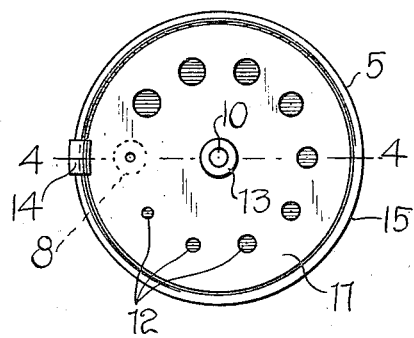
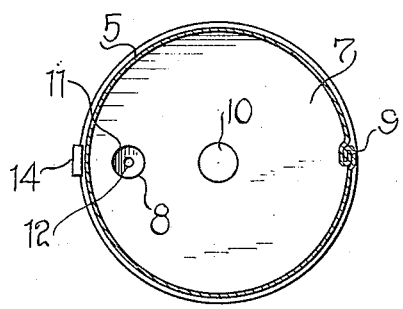
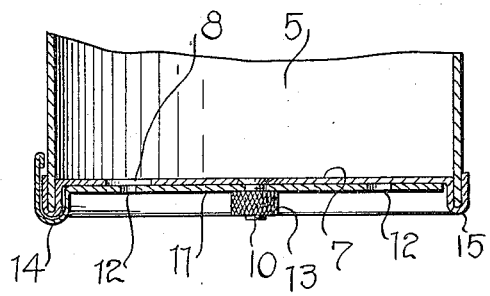
Witnesses
Robert M. Sutphen
A. I. Hind
Inventor
W. J. Reeser
By Watson E. Coleman
Attorney

UNITED STATES PATENT OFFICE.

WILMER J. REESER, OF BUTLER, MINNESOTA, ASSIGNOR OF ONE-HALF TO AMOS MARCKEL, OF PERHAM, MINNESOTA.

SEED-PLANTING DEVICE.

1,124,523.     Specification of Letters Patent.     Patented Jan. 12, 1915.

Application filed January 30, 1914. Serial No. 815,509.

*To all whom it may concern:*

Be it known that I, WILMER J. REESER, citizen of the United States, residing at Butler, in the county of Ottertail and State of Minnesota, have invented certain new and useful Improvements in Seed-Planting Devices, of which the following is a specification, reference being had to the accompanying drawings.

This invention relates to a seed planting device and more particularly to a container or hopper for the seeds, the primary object of the invention being to provide a device of this character adapted to be carried in the hand of the operator and improved means for regulating the quantity of seed distributed therefrom when the contents of the container are agitated.

My invention has for another and more specific object to provide a container or receptacle for the seeds to be planted including a body provided with a removable closure on one end, said body having a longitudinal seam and an opening in its opposite end diametrically opposed to said seam, and an adjustable valve plate mounted on the exterior face of the latter end of said body and having a series of openings of different sizes, said plate being adjustable to dispose any one of said openings in coinciding relation to the opening in the end wall of the container body.

My invention has for a further object to provide a hand operated seed planting device of the above character which is of great convenience in practical use, enabling the operator to plant a large number of seeds in a comparatively short time and without undue waste.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawings, in which—

Figure 1 is a side elevation partly in section of the seed planting device embodying my invention in its preferred form. Fig. 2 is a section taken on the line 2—2 of Fig. 1. Fig. 3 is a plan elevation. Fig. 4 is an enlarged section taken on the line 4—4 of Fig. 3.

Referring in detail to the drawing, 5 designates a receptacle or container body which is preferably though not necessarily cylindrical in form. One end of this body is provided with a removable closure cap 6. In the opposite end or bottom wall 7 of the container an opening 8 of suitable size is formed. It is to be particularly noted that this opening which is contiguous to the outer edge of the can bottom is located at a point which is diametrically opposed to the longitudinal seam 9 of the container body 5. A threaded stud or bolt 10 is fixed at one of its ends centrally in the bottom wall 7 of the container.

11 designates a rotarily adjustably valve plate which is provided with a central opening to receive said threaded stud. In this valve plate a circular series of openings 12 are punched or otherwise formed. These openings it will be observed vary in size. The largest of said openings, however, is of less diameter than the diameter of the opening in the bottom wall 7 of the container or receptacle. A nut 13 is threaded upon the stud 10 and is adapted for frictional engagement against the under side of the valve plate 11. It will be readily understood that by means of this nut said plate may be secured in its adjusted position with any one of the openings therein in registration with the outlet opening 8 in the wall 7 of the container.

Upon the outer edge of the valve plate 11 a finger piece 14 is formed. This finger piece is bent into looped or U-shaped form and extends around the bead 15 on the lower edge of the container body and upwardly for a short distance against the exterior surface of the body wall. When it is desired to adjust the valve plate 11, the operator simply loosens the nut 13 and engages said finger piece with the finger to rotate the plate so as to position another of the openings therein in registering relation with the outlet opening 8.

From the foregoing description, taken in connection with the accompanying drawings, the construction and manner of operation of my invention will be clearly and fully understood. After the seeds have been placed in the container, the upper end thereof is closed by means of the cap 6. The valve plate 11 is then adjusted so as to position one of its openings in registration with the opening 8 in accordance with the quantity of seed it is desired to feed, and the device is then in condition for use. The operator passes along the seed receiving furrow which has been formed in the surface of the ground, holding the device directly above said furrow. Upon agitating the container, it will be readily understood that the seed will be expelled through the outlet opening 8 in the bottom thereof and the coinciding opening 12 in the adjustable valve plate. By means of such device a large quantity of seed may be quickly and properly planted.

My invention, owing to its extremely simple construction may be produced at small manufacturing cost and is convenient and serviceable in practical use. It will of course be understood that the container 5 may be made of any desired capacity and the sizes of the openings in the bottom wall thereof and the adjustable valve plate varied accordingly.

While I have shown and described the preferred construction and arrangement of the several elements employed, it will be understood that the invention is susceptible of considerable modification therein, and I therefore reserve the privilege of resorting to all such legitimate changes as may be fairly embodied within the spirit and scope of the invention as claimed.

What is claimed is:

The combination with a container body having a longitudinal seam and provided with a closure cap on one end, the opposite end of said body being provided with an opening therein contiguous to its periphery which is located diametrically opposite to the seam in the body of said container, a threaded stud centrally secured in said bottom wall, a rotarily adjustable valve plate loosely engaged upon said stud and provided with a circular series of openings of various sizes, a finger loop formed upon the periphery of said valve plate and bent around the lower edge of the container body and extending upwardly upon the exterior surface of the body wall thereof whereby said plate may be rotated to dispose any one of the openings therein in registering relation to the opening in the bottom of the container, and a nut threaded upon said stud to secure the valve plate in its adjusted position.

In testimony whereof I hereunto affix my signature in the presence of two witnesses.

WILMER J. REESER.

Witnesses:
A. MARCKEL,
F. J. SCHOENEBERGER.